Patented Oct. 3, 1939

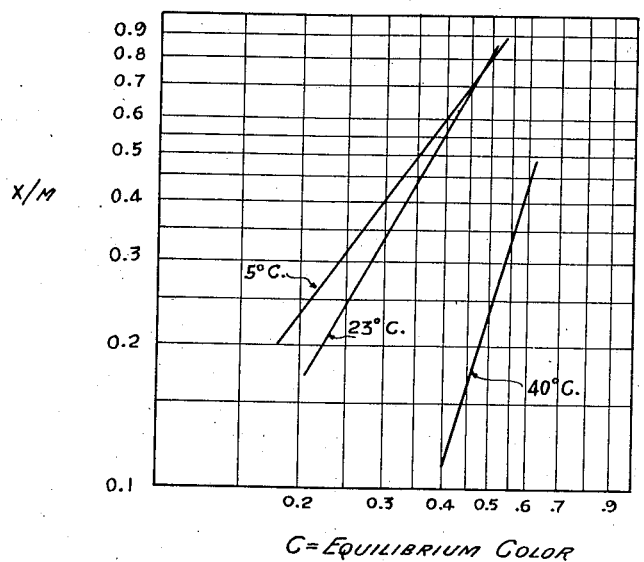
ADSORPTION ISOTHERMS - FILTER-CEL
C = EQUILIBRIUM COLOR
X/M = COLOR UNITS REMOVED PER GM. OF ADSORBENT PER 100 C.C. OF "PROTEIN-FREE" MILK.

2,175,014

UNITED STATES PATENT OFFICE 2,175,014

VITAMIN CONCENTRATION

Lela E. Booher and Lincoln T. Work, New York, N. Y.

Application July 25, 1936, Serial No. 92,531

12 Claims. (Cl. 167—81)

This invention relates to the preparation of a food material and more particularly to the preparation of concentrates of dietary essentials known as vitamins.

Among the substances known as vitamins, there is a group commonly designated as the vitamin B-complex which group, originally believed to be the anti-neuritic vitamin, has now been found to comprise at least three vitamins, namely vitamin B( $B_1$) or the anti-neuritic vitamin; vitamin G or lactoflavin and certain other flavins; and vitamin H described in co-pending application Serial No. 86,305. At least one, and perhaps both of the vitamins G and H, are considered essential in the prevention of pellagra in human beings, black tongue in dogs, and analogous ailments in experimental rats.

Vitamin G is an organic compound having a yellow color and a flavine structure. In one of its forms it is the water-soluble yellow, green-fluorescent pigment of whey or at least, the pigment is itself an integral part of the vitamin. In the presence of strong acid, the green fluorescence is absent. The vitamin has been isolated and structures such as the following have been synthesized and found to possess the specific properites of vitamin G and to possess high vitamin G potency:

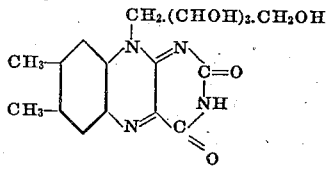

This vitamin G activity of the compound, as indicated by rat growth tests, depends in part on the stereochemical configuration of the sugar group present in the molecule, not all of the stereoisomers of this chemical formula being active, and the active forms varying in degree of vitamin G activity.

Vitamin G occurs naturally in a number of food products, as for example, skim milk, egg white, yeast, liver, lean meats, green vegetables, and the like, the nomenclature of a particular flavin being frequently derived from its source, hence the names lactoflavin from milk, ovoflavin from eggs, hepatoflavin from liver, and so on. Milk is a comparatively good source of the vitamin and has been quite commonly used for the preparation of vitamin G concentrates. In this case, where casein may be removed for the production of paints or of cheese, there is left a liquid whey as a by-product from which the vitamin may readily be obtained.

While it is also possible to obtain the vitamin by synthesis, at present there are practical difficulties which make it preferable to produce vitamin G by concentration from such natural sources rather than by synthesis. Since not all of the stereoisomeric forms of the sugar group in the flavine have the same vitamin G potency, only those which have such potency are sought. It has been found that the greatest vitamin G activity is present when the sugar group is a d-ribose group.

On the other hand, the concentration of vitamin G from natural sources provides a clean-cut way of providing the desired form of the vitamin and at the same time, offers an outlet for use of the whey, e. g. formed as by-product in the cheese industry.

Concentrations of vitamin G have been prepared in varying degrees of potency by several workers. Booher has used whey powder and by successive extraction with alcohol, alcohol-chloroform and ether, has largely eliminated the sugars, proteins and fats of the whey powder to yield a concentrate containing vitamins G and H. These have been separated and further concentrated by adsorbing vitamin G on fuller's earth (or Lloyd's reagent) from aqueous acid solutions. Elution of the earth with a solution of water, alcohol, and pyridine has yielded good recovery of a concentrated form of vitamin G, but the step has the objection that these organic solvents are expensive, and further that it is very difficult to remove the last traces of pyridine. Kuhn and others have added the earth directly to an acidified aqueous solution of whey.

One disadvantage of certain previous methods is that there are required large quantities of material to be treated with expensive solvents, as the first step of the process.

Other previous methods have included a crude separation of the vitamin from the other constituents of the whey by adsorption on fuller's earth. In such case, the whey is made approximately 1 molar with respect to HCl before the adsorption. The vitamin adsorbed on the earth is then removed by elution of the earth with a mixture of pyridine, methyl alcohol and water. The eluate is then concentrated, purified, and a second adsorption is carried out, followed by further purification and concentration. In such case, the quantity of material to be treated is greatly reduced in the first step by adsorption. However, a large amount of HCl must be used to make the considerable volume of whey 1 molar and the removal of pyridine is difficult.

Precipitation of the vitamin with heavy metals such as thallium, silver, and lead at a later stage with ultimate removal of metal has also been employed.

These procedures for the elimination of carbohydrates, proteins, and fats are adaptable to the other sources of vitamin G than milk.

The procedures of the prior art for concentrating the vitamin from natural sources possess two major objections: first, the use of organic solvents, such for example as ethyl alcohol, chloroform, ether, and the like, is very expensive, particularly if these are applied to the extraction of the large bulk of the source material, and second the use of pyridine or heavy metals in any step introduces the possibility of ultimate contamination of the product thereby rendering it unsuitable for nutritional purposes. These difficulties have heretofore prevented economical quantity production of highly potent concentrates safe for human consumption and animal feeding. In fact, these difficulties have heretofore been so great as to cause certain producers to market vitamin G concentrates of low potency on silicious earth without removal from the earth. While it has been possible to remove the vitamin G from the earth, heretofore there has existed no satisfactory method for economically producing potent concentrates of the vitamin in relatively large quantities.

It is characteristic of the vitamins that they are all present in very small amounts in the natural products from which they have had to be separated. This necessitates the use of large quantities of the raw materials used for the production of the vitamin, if any appreciable amount of the vitamin is to be recovered. Using such large quantities of raw material, e. g. whey, it is important to rapidly decrease the amount of material treated during the initial stages by relatively inexpensive operations. This done, it then becomes feasible to use the more expensive reagents for further concentration and purification.

Preliminary crude separation of the vitamin from the bulk material may be accomplished by adsorption on fuller's earth or other silicious adsorbent such as clay or Filtercel. These are examples of hydrophilic or water-favoring adsorbents,—some of which may be produced synthetically in the laboratory, as, for instance, silica gel. Adsorption on adsorbent carbon is also possible, in which case vitamin H as well as vitamin G will be adsorbed if present, and there might also be adsorbed some vitamin B ($B_1$).

Having in mind the prior art, it is an object of this invention to produce at low cost from natural sources, a concentrate of vitamin G free from or in presence of other vitamins of the vitamin B-complex.

It is a further object of this invention to effect this concentration through the use of procedures and reagents such that there will be no possibility of having injurious reagents present in and contaminating the produced concentrate.

It is a still further object of this invention to provide new low cost methods to effect still greater concentration of the vitamin following its elution from the earth.

According to the process of this invention, there may be used any of the food material sources of vitamin G, but obviously it is preferred to use those from which the vitamin may be secured most readily. Where not already in aqueous solution, an aqueous solution or extract is prepared, any excess fat being separated either mechanically or with the aid of the usual fat solvents. Following this, the solution is taken to the iso-electric point of proteins therein to be precipitated and the thus-precipitated proteins are separated.

Then only minor quantities of fat and protein remain, while the vitamin is present with the salts and carbohydrates and other substances which may have been carried thru from the source material. It is found that the iso-electric point of casein, pH about 4.6–4.9, is satisfactory acidity for adsorption of vitamin G on earth, though it is necessary to use a larger amount of adsorbent earth, or to use several batches successively, than would be the case if higher acidity were employed.

Filtercel has been found to be a particularly good adsorbent for vitamin G, and as the pH of the solution from which the adsorption takes place is decreased, the amount of Filtercel required for the adsorption is also decreased. However, with Filtercel, it is found that no increase in acidity is required if when working with milk, 6 grams are used per 100 cc. protein-free milk. By use of this amount of adsorbent, a large saving may be made in the cost of treatment due to the need for using so much less acid. This invention is not restricted to this amount, as more or less earth or other silicious earths and on different starting materials earth of different activity may be used at different efficiencies.

It is found that the adsorption takes place most effectively at room temperature or below.

The earth is then filtered and washed to free it of dissolved material in the intersticial films. In this invention, departure is made at this point from the procedure of those who dry the earth to sell it as a source of concentrated vitamin G and also from the procedure of those who use pyridine or strong alkali.

According to this invention, we have found that, while the vitamin is adsorbed on the earth at lower temperatures from an aqueous solution, at elevated temperatures, this adsorption is reversed and water or solutions of the approximate pH of water will serve to elute the vitamin from the earth. In this way a large proportion of the adsorbed vitamin will be removed by hot water or hot aqueous solutions. The extent of the reversal increases with temperature, hence at high temperatures there will be less volume of eluate for a given recovery.

Superheated water, i. e. under pressure in an autoclave, may be used. Care must be taken not to employ temperatures which, under the conditions of carrying out the procedure, would injure constitutents in the product. Depending on the starting material, degree of acidity of the solution, different temperatures are limiting, the effect of too great temperature under the particular set of conditions manifesting itself in various ways, for instance, with the destruction of organic materials such as sugars, there may be impairment of the taste of the product, caramelization of the sugars, or even destruction of the vitamin.

The absorbent earth is removed by filtration such as on a plate and frame filter press at elevated temperature and the eluate is concentrated by evaporation, preferably in vacuum. The earth may be used for further adsorption by recycling.

Thus, although only a fraction, say one third to two thirds of the vitamin adsorbed on fresh earth is removed by hot water elution, the re-use of the earth permits effective recoveries. The usual engineering devices of countercurrent adsorption and elution may also be used to secure a maximum amount of vitamin in the hot water.

Obviously, good engineering practice over a series of runs calls for the use of comparatively fresh earth on the depleted whey and partially saturated earth in first contact with the whey. Thus a larger quantity of vitamin G will be finally adsorbed on a unit weight of earth, when the adsorption can attain equilibrium with solution having a greater vitamin G concentration than would be true if the earth were finally in equilibrium with solutions of lesser vitamin G concentration.

Washing technique using cold water to remove the soluble material in the intersticial fluid of the earth cake must also take account of a partial elution and wash water may have to be treated with fresh earth.

A sequence similar to that used in adsorption may be followed for elution using hot water; namely to elute earth which has been previously partially eluted and progress to earth containing the larger amounts of vitamin G, thus yielding more concentrated solutions of eluted vitamin G. Such procedures are commonly practiced in counter-current leaching of ores and precipitates.

For this elution of the vitamin from the earth, we have also used hot lime water solution, hot dilute actic acid, also hot alcohol of different strengths. Since vitamin G is destroyed in hot alkaline solutions, solutions of greater alkalinity than that of a saturated solution of calcium hydroxide would normally not be used, particularly where an appreciable time of contact between the vitamin and solution would be required.

In like manner, hot solutions of other acids may be used to remove the vitamin from the earth, the kind and concentration of acid to be used depending on the temperature, time of contact, and the effect of the acid on the vitamin or other organic material present. Hydrochloric acid, sulfuric acid (suitable for use in food products) and other common acids might be used, though there is danger, in strong acid solutions, of hydrolyzing the vitamin or decomposing other organic materials present with the vitamin. In such cases the excess acid might need to be eliminated as by precipitation as with silver or lime due to increase in intensity on increased concentration.

It is not possible to specify the exact conditions of and range of alkalinity permitted, as obviously, with lower temperatures, higher acidities or alkalinities are imposed. Practically, however, since economy is one of the objects of this invention, water is obviously the simplest of these reagents and will hereafter be used as preferred embodiment and for illustrative purposes.

In the case of the hot lime water, the small amount of lime may be precipitated out after elution by the use of carbon dioxide. In the case of hot aqueous acetic acid, that may be removed by evaporation. The value in such elution mixtures appears to lie in the effect upon the earth, there being often less earth carried into the eluate than if water is used. In the case of hot alcohol or hot aqueous solutions of alcohol, the alcohol may be evaporated and recovered for re-use. It is also possible to effect elution in the filter-press using a lesser volume of elution medium if hot alcohol is first brought into contact with the earth and if this is subsequently displaced by hot water.

It should be empasized that such elutions as with pyridine so contaminate the earth that it is not fit for re-use without costly treatment, while the earth eluted with hot water is free of displacement products. Furthermore it is difficult to completely remove the pyridine from the concentrate during the process of evaporation and to recover the pyridine in condition for re-use.

During the process of the concentration of the eluate, appreciable amounts of suspended earth begin to precipitate. It is desirable to remove this earth before the concentration of the solution is so great that significant amounts of vitamin G are adsorbed upon it. Many of the well-known coagulating agents will suffice for flocculation of the earth. It is found that dilute acetic acid, lime water, alcohol and the like will produce this effect. After the earth is separated, it may be necessary to effect a new elution in a manner similar to any of those described. As an alternative, the suspended earth and concentrate may be dried under controlled temperature conditions, preferably not over 80–100° C. and extracted after drying with solvents of the type heretofore mentioned as satisfactory for elution purposes, such as boiling ethyl or methyl alcohol or hot dilute acetic acid.

The total eluate, essentially freed of earth may be evaporated to yield a solid concentrate of vitamin G. Whereas the original skim milk powder if this starting material were used, would contain about 3 to 4 units of vitamin G per gram of dry solids, the concentrates at this stage have yielded from 800 to 1500 units per gram of dry solids.

These units for measuring vitamin concentration are based on an arbitrary scale of rat growth under standardized conditions which are well-defined in the literature. In other words, the growth rate induced by a certain amount of milk powder would be induced by one five hundredth of that weight of concentrate when the concentration was five hundred fold over that in milk powder. Concentrations have been determined by rat-feeding tests and confirmed by colorimetric tests, since lactoflavin has a yellow color.

Hereafter in the specification, concentrations of the vitamin are given in terms of yellow units of these colorimetric measurements, these yellow units being measured with standard Lovibond glasses. The depth of the solution for color measurement was 1.0 cm. usually except where intensity of color required lesser or greater depths for accurate measurement and then the color values were recalculated for standard 1.0 cm. depth. There is found to be a direct proportionality between color intensity and rat growth units.

Use of colorimetric measurements has the advantage that readings can be made rapidly and easily to indicate the changes in the concentration of vitamin G occurring throughout the various steps.

We may also use active earth as Lloyd's reagent to remove vitamin G from a concentrated eluate from the first adsorption. Vitamin G is adsorbed on Lloyd's reagent to a greater extent than the impurities present with it in the solution, so that this adsorption in effect gives further purification. The first adsorption and elution eliminate a larger proportion of the diluent organic matter and leave concentrations of the other ingredients including vitamin G in certain proportions depending upon the selective action of the earth. If these ingredients be concentrated in the eluate by evaporation of much of the water, new ratios of adsorption are established between the ingredients and further concentration of vitamin G may be effected. In such a case, smaller amounts of earth may be used and the elution procedures altered by the use of organic solvents, which earlier in the process would be too costly. We do not consider ourselves restricted to any specific details or combinations in further concentrating the first eluate.

A similar adsorption and elution system may be carried out using active carbon in place of earth at any stage in the concentration, the elution medium being preferably a benzene-alcohol mixture on dried carbon containing the vitamin. Due to the azeotropic properties of the water-benzene-alcohol system, the water may be removed by distillation after wet carbon has been placed in the elution medium. By this process also, the use of objectionable contaminants is avoided for elution agents.

If it be desired to concentrate the vitamin beyond the first stage, the eluate may be concentrated to about 1 to 5 percent solids in solution or any suitable point below the saturation point for the ingredients, and active carbon may be added in sufficient amounts to reduce the color substantially, i. e. to adsorb the vitamin G. The carbon is then filtered, washed, and eluted with an organic solvent such as preferably boiling benzene-alcohol mixtures. The eluate on evaporation has a potency from 2 to 5 times that of the solids from which it was removed by the carbon. As an alternative, the vitamin may also be concentrated further by extraction of the dry solids with suitable solvents as for example absolute alcohol, benzene-alcohol, etc., which increase the vitamin potency several fold depending upon the amount of solvent, its nature, the extraction temperature, and the like.

As an example of the operation of this invention, there follows data on a test run using skim milk powder. However, the invention of this process is not restricted to the use of skim milk powder or of protein-free milk but may be employed with other vitamin G bearing substances such as yeast, liver, etc. as heretofore mentioned. The use of skim milk powder necessitates the introduction of two steps in the process which would be needless if whey were used. In like manner starting with materials from sources other than milk, slight obvious modifications of procedure may become necessary.

To simulate skim milk it was first necessary to reconstitute the available milk powder into skim milk by mixing 40 lbs. of powdered milk with 300 lbs. of water, or approximately one pound of milk powder to eight pounds of water, giving a product of approximately the same composition as ordinary skim milk.

The reconstituted skim milk was heated to about 60° C. and 860 cc. concentrated hydrochloric acid were added to precipitate the casein and other proteins such as lactalbumen and lactoglobin, the final pH of the so-produced "protein free" milk in this step being about 4.4–4.6. Heating was further continued to about 80–85° C. The precipitate or curd was filtered out on a filter press and a slightly turbid solution of greenish yellow color resulted. The greater part of this color was due to lactoflavin (vitamin G), and color was used as an indication of yield, this being confirmed at stages of considerable concentration by rat feeding tests. At a depth of 1 cm. in the Lovibond tintometer, the reading of the "protein free milk" was .7 yellow unit.

670 grams of Filtercel were added, the solution having been cooled with ice to about 10–20° C.; and after standing one-half hour, the earth was filtered off. The filtrate was found to contain 0.2–0.3 yellow unit. By treatment with more earth or a batch of fresh earth, a better total adsorption resulted. The earth was then washed with a limited amount of cold water, about one-quarter to one-eighth the volume of filtrate from the earth. The wash became colored to about the extent of this filtrate or a little less.

Live steam was passed into the filter and it condensed as the earth and press warmed reaching a temperature of around 60–90° C. A solution having a decided yellow color resulted. The color diminished as the volume of eluate increased, until with about one-half recovered from the total vitamin G adsorbed on the earth, the resulting eluate measured about .4 to .6 yellow unit and a volume somewhat less than the original filtrate. The eluate was concentrated in vacuum and dried. The dried product was extracted with boiling alcohol, the insoluble earth filtered off, and the vitamin G concentrate recovered on evaporation of the alcohol. Overall yields were on the order of 25 per cent of the color-volume units in the original solution from which the casein had been filtered, or 50% of the amount adsorbed on the earth. In this elution, with hot water, about one-half of the vitamin remained on the earth but as the earth had not been injured in its adsorbing property, it could be re-used to adsorb more vitamin G and again eluted with essentially complete recovery of the vitamin G taken up the second time. The overall yield through re-use of the earth would therefore approach more closely to 100 per cent. Furthermore, if a counter-current scheme is used whereby the earth finally attains equilibrium with the concentration of vitamin G in the original protein-free milk, that is .7 color unit instead of .3, the amount of vitamin G recoverable on the first elution is much greater than that observed in this sample run.

The eluate was evaporated under vacuum to solid state and was extracted with small volumes of hot alcohol and the extract evaporated to dryness. Depending upon the amount of alcohol used, potencies ranging from 810 to 1500 rat growth units were obtained. The larger amount of alcohol dissolved more of the major constituent of the concentrate, lactose, thereby lowering the vitamin G potency of the final concentrate.

The drawing shows illustrative curves based upon adsorption by Filtercel at different temperatures, the curves being based on the following test results:

300 gm. of milk powder were added to 2400 cc. of distilled water with rapid stirring. The mixture was heated to 80° C. and 585 cc. of 1% HCl were added. The heating was continued until the temperature reached 85° C. The mixture was allowed to cool for about 10 minutes and then filtered.

Four samples of 100 cc. of "protein-free" milk prepared as previously described, were treated with various amounts of Filtercel at constant temperature. The Filtercel was allowed to remain in contact with the solution for 20 minutes and then filtered as rapidly as possible. The color of this filtrate was determined with the Lovibond tintometer, three series of tests being made at temperatures of 5°, 23°, and 40° C. The color reading at 1 cm. on the "protein-free" milk was 0.70 yellow unit (expressed 0.70 Y).

Series A—Temp. 5° C.

| Sample | Grams of Filtercel | Final color (1 cm.) |
|---|---|---|
| 1 | 0.250 | 0.5 Y |
| 2 | 0.500 | 0.4 Y |
| 3 | 1.000 | 0.3 Y |
| 4 | 1.500 | 0.2 Y |

Series B—Temp. 23° C.

| Sample | Grams of Filtercel | Final color (1 cm.) |
|---|---|---|
| 5 | 0.250 | 0.5 Y |
| 6 | 0.500 | 0.4 Y |
| 7 | 1.000 | 0.3 Y |
| 8 | 1.500 | 0.3 Y |

Series C—Temp. 40° C.

| Sample | Grams of Filtercel | Final color (1 cm.) |
|---|---|---|
| 9 | 0.250 | 0.6 Y |
| 10 | 0.500 | 0.5 Y |
| 11 | 1.000 | 0.5 Y |
| 12 | 1.500 | 0.45 Y |

In plotting the adsorption isotherms, the following values are used:

$x$—Initial color minus final color
$m$—Grams of adsorbent per 100 cc. of "protein-free" milk
$C$—Final or equilibrium color so calculating these test data to give values for $x$ and $x/m$, there are obtained the following:

Series A—Temp. 5° C.

| $x$ | $m$ | $x/m$ | $C$ |
|---|---|---|---|
| 0.2 | 0.25 | 0.80 | 0.5 |
| 0.3 | 0.50 | 0.60 | 0.4 |
| 0.4 | 1.00 | 0.40 | 0.3 |
| 0.5 | 1.50 | 0.33 | 0.2 |

Series B—Temp. 23° C.

| $x$ | $m$ | $x/m$ | $C$ |
|---|---|---|---|
| 0.2 | 0.25 | 0.80 | 0.5 |
| 0.3 | 0.50 | 0.60 | 0.4 |
| 0.4 | 1.00 | 0.40 | 0.3 |
| 0.4 | 1.50 | 0.27 | 0.3 |

Series C—Temp. 40° C.

| $x$ | $m$ | $x/m$ | $C$ |
|---|---|---|---|
| 0.10 | 0.25 | 0.40 | 0.60 |
| 0.20 | 0.50 | 0.40 | 0.50 |
| 0.20 | 1.00 | 0.20 | 0.50 |
| 0.25 | 1.50 | 0.17 | 0.45 |

The change in slope of the isotherms is particularly significant, the trend being towards higher values of the equilibrium color as the temperature is increased. From the viewpoint of adsorption, the equilibrium color decreases as the temperature decreases and the decrease in the equilibrium color for a given temperature difference is greater for small values of $x/m$. From the viewpoint of elution, an increase in temperature gives an increase in equilibrium color.

Thus it will be seen that water at any temperature will remove some vitamin G from earth on which it is adsorbed, but that higher concentrations of vitamin G are obtained in the eluting medium as the temperature of the elution system is raised. This invention need not be restricted as to temperature, but is preferably operated at elevated temperatures where the efficiency of elution is greater.

At temperatures higher than that at which adsorption took place, the elution fluid will attain a higher color than the residual color in the adsorption equilibrium solution. Thus it will be seen that the adsorption is reversed in water and certain other solvents, the efficiency of the reversal increasing with increase in temperature within the limits of stability of the vitamin, or other constituents of the concentrate.

It is thus seen that this invention, involving the use of simple readily available and inexpensive solvents in reducing the volume of vitamin-containing material being worked with to such a point that it is economically feasible to then apply more expensive solvents, has made commercially possible the preparation of concentrates of the vitamin in quantity sufficient to meet the need for such a concentrate. Furthermore, it has shown how this can be done without the need for employing eluting fluids of poisonous nature which must be completely removed from the concentrates of the vitamin if they are to be safe for human or animal consumption. The economy of using water permits inexpensive treatment as the water does not have to be recovered.

The importance of having, not only a concentrate safe for consumption, but also one in adequate quantities, and in highly concentrated form is realized when it is recognized that when the pathological effects of a lack of the vitamin are recognized in a patient, there is generally a lack of appetite which makes feeding of large quantities of vitamin-containing materials difficult if not impossible, and at the same time, feeding of the vitamin in concentrated form must often be continued for some time before normal feeding can be begun.

By demonstrating how such concentrates can be attained, from natural sources, there is made possible the conversion of by-product material into useful and valuable production on a scale not heretofore feasible.

We claim:

1. In a process for the preparation of a concentrate of vitamin G wherein the vitamin is adsorbed from solutions thereof on adsorbent earth, the steps of eluting vitamin G therefrom by means of a solvent selected from a group consisting of water, alcohol, dilute acetic acid; effecting the elution and separating the eluate from the adsorbent at an elevated temperature with respect to the temperature during the period of adsorption.

2. In a process for the preparation of a concentrate of vitamin G wherein the vitamin is adsorbed from solutions thereof on a silicious adsorbent, the steps of eluting vitamin G therefrom by means of a solvent selected from a group consisting of water, alcohol, dilute acetic acid; effecting the elution and separating the eluate from the adsorbent at an elevated temperature with respect to the temperature during the period of adsorption.

3. In a process for the preparation of a concentrate of vitamin G wherein the vitamin is adsorbed from solutions thereof on adsorbent earth, the steps of eluting vitamin G therefrom by treatment with water at an elevated temperature and of separating the eluate from the earth at a temperature above that at which the adsorption had taken place.

4. In a process for the preparation of a concentrate of vitamin G wherein the vitamin is adsorbed from solutions thereof on adsorbent earth, the steps of eluting vitamin G therefrom by treatment with an aqueous solution of alcohol of any concentration at an elevated temperature and of separating the eluate from the earth at a temperature above that at which the adsorption had taken place.

5. In a process for the preparation of a concentrate of vitamin G wherein the vitamin is adsorbed from solutions thereof on adsorbent earth, the steps of eluting vitamin G therefrom by treatment with dilute acetic acid at an elevated temperature and of separating the eluate from the earth at a temperature above that at which the adsorption had taken place.

6. A process for the preparation of a concentrate of vitamin G from aqueous solutions thereof which comprises adding an amount of silicious adsorbent material whereby the greater part of the vitamin is adsorbed from the solution; separating the silicious adsorbent from the body of the solution; treating the silicious adsorbent with a solvent selected from a group consisting of water, alcohol, dilute acetic acid, at an elevated temperature; separating the solvent from the adsorbent at a temperature above that at which adsorption had taken place; preparing an aqueous solution from the eluate by removing any nonaqueous solvent which may be present; adding an amount of adsorbent carbon to the solution whereby the greater part of the vitamin is removed from the solution; separating the carbon from the solution; eluting vitamin G from the carbon with benzene-alcohol and separating the benzene-alcohol from the carbon at an elevated temperature; and evaporating the benzene-alcohol from the so-produced solution.

7. A process for the preparation of a concentrate of vitamin G from aqueous solutions thereof which comprises adding an amount of a silicious adsorbent material whereby the greater part of the vitamin is adsorbed from the solution; separating the silicious adsorbent from the body of the solution; treating the silicious adsorbent with a solvent selected from a group consisting of water, alcohol, dilute acetic acid, at an elevated temperature; separating the solvent from the adsorbent at a temperature above that at which adsorption had taken place; and concentrating the so-produced solution.

8. A process for the preparation of a concentrate of vitamin G from aqueous solutions thereof which comprises adding an amount of a silicious adsorbent material whereby the greater part of the vitamin is adsorbed from the solution; separating the silicious adsorbent from the body of the solution; treating the silicious adsorbent with a solvent selected from a group consisting of water, alcohol, dilute acetic acid, at an elevated temperature; separating the solvent from the adsorbent at a temperature above that at which adsorption had taken place; preparing an aqueous solution from the eluate by removing any non-aqueous solvent which may be present; precipitating the vitamin from the aqueous solution with an aqueous solution of a heavy metal salt selected from a group comprising silver, lead, thallium; and separating from the solution the precipitate from which the vitamin G may be recovered.

9. A process for the preparation of a concentrate of vitamin G from aqueous solutions thereof which comprises adding an amount of adsorbent earth whereby the greater part of the vitamin is adsorbed from the solution; separating the earth from the body of the solution; treating the earth with a solvent selected from a group consisting of water, alcohol, dilute acetic acid, at an elevated temperature; separating the solvent from the earth at a temperature above that at which adsorption had taken place; and concentrating the so-produced solution.

10. A process for the preparation of a concentrate of vitamin G from aqueous solutions thereof which comprises adding an amount of adsorbent carbon to the solution to remove the greater part of the vitamin from the solution; separating the carbon from the body of the solution; eluting vitamin G from the carbon with benzene-alcohol and separating the benzene-alcohol from the carbon at an elevated temperature; and evaporating benzene-alcohol from the so-produced solution.

11. A process for the preparation of a concentrate of vitamin G which comprises treating whey solution at substantially normal temperature with an amount of a silicious adsorbent whereby the greater part of the vitamin is adsorbed from the solution; separating the adsorbent from the body of the solution; treating the adsorbent with a solvent selected from a group consisting of water, alcohol, dilute acetic acid, at an elevated temperature; separating the solvent from the adsorbent at a temperature above that at which adsorption had taken place; and concentrating the so-produced solution.

12. A process for the preparation of a concentrate of vitamin G which comprises treating a solids-free aqueous extract from yeast at substantially normal temperature with an amount of silicious adsorbent whereby the greater part of the vitamin is adsorbed from the solution; separating the adsorbent from the body of the solution; treating the adsorbent with a solvent selected from a group consisting of water, alcohol, dilute acetic acid, at an elevated temperature; separating the solvent from the adsorbent at a temperature above that at which adsorption had taken place; and concentrating the so-produced solution.

LELA E. BOOHER.
LINCOLN T. WORK.